United States Patent

[11] 3,614,070

| [72] | Inventor | Bernard A. Loomans<br>Saginaw, Mich. |
|---|---|---|
| [21] | Appl. No. | 827,563 |
| [22] | Filed | May 26, 1969 |
| [45] | Patented | Oct. 19, 1971 |
| [73] | Assignee | Baker Perkins, Inc.<br>Saginaw, Mich. |

[54] MULTIPLE ORBITING SCREW MIXING APPARATUS
10 Claims, 4 Drawing Figs.

[52] U.S. Cl. ................................................ 259/102,
259/40, 259/179
[51] Int. Cl. ................................................ B01f 7/02
[50] Field of Search ................................ 259/5, 21,
40, 64, 102, 179, 104

[56] References Cited
UNITED STATES PATENTS
| 2,170,303 | 8/1939 | Helstrup | 259/104 X |
| 2,893,709 | 7/1959 | Nauta | 259/102 X |
| 3,338,562 | 8/1967 | Fox | 259/40 |
| 3,450,390 | 6/1969 | Nauta | 259/102 |

FOREIGN PATENTS
| 138,191 | 9/1960 | U.S.S.R. | 259/104 |

Primary Examiner—Walter A. Scheel
Assistant Examiner—Alan I. Cantor
Attorney—Learman, Learman & McCulloch ABSTRACT: A mixing apparatus for use with a mixer housing having generally conically-shaped sidewalls including a pair of orbitally mounted screws which cyclically wipe portions of the conical sidewalls to remove material adhering thereto. Each of the screws is also mounted for rotation about its own longitudinal axis, the longitudinal axes of the two screws being parallel to each other, and also generally parallel to the conically-shaped sidewalls. The two screws are in intermeshing relation so that portions of the two screws are in wiping engagement to effect a mutual wiping and cleaning.

FIG. I.

INVENTOR.
BERNARD A. LOOMANS

INVENTOR.
BERNARD A. LOOMANS

MULTIPLE ORBITING SCREW MIXING APPARATUS

This invention relates to mixing apparatus, and more particularly to a self-cleaning device which can be used to process a variety of compositions including material which degradates with the passage of time and would contaminate the mix if left to deteriorate on the walls of the mixer or flights of the screws.

Orbiting mixing screws have been used in mixers to wipe the walls of the mixing container. However, to my knowledge such mixers have not fully solved the problem because the material being removed and mixed has tended to "hang-up" on the blades of the screw and similarly deteriorate and contaminate the mixture. It is desirable, therefore, that there be provided some means for automatically removing the material adhering to the screw which is removing the material from the sidewalls of the mixing container.

It is further desirable that apparatus be employed to also clean the cleaning apparatus which is removing the material from the first screw. It has been discovered that a second screw, intermeshing with the first screw, can be effective for this purpose.

One of the prime objects of the present invention is to provide a mixing apparatus having interacting screws that will remove material from each other without negating their capacity to remove material from the sides of the container.

In accordance with the present invention there is provided a mixing apparatus including generally conically shaped walls and a pair of rotatable screws extending parallel to at least a portion of the sidewalls. The screws are intermeshed, with portions of both screws being in sliding or wiping engagement to effect a mutual cleaning action. Means are provided for rotating each of the screws about its own axis in addition to orbiting the pair of rotatable screws within the container.

Other objects and advantages of the invention will be pointed out specifically or will become apparent from the following description, when it is considered in conjunction with the appended claims and the accompanying drawings, in which:

Figure 3:
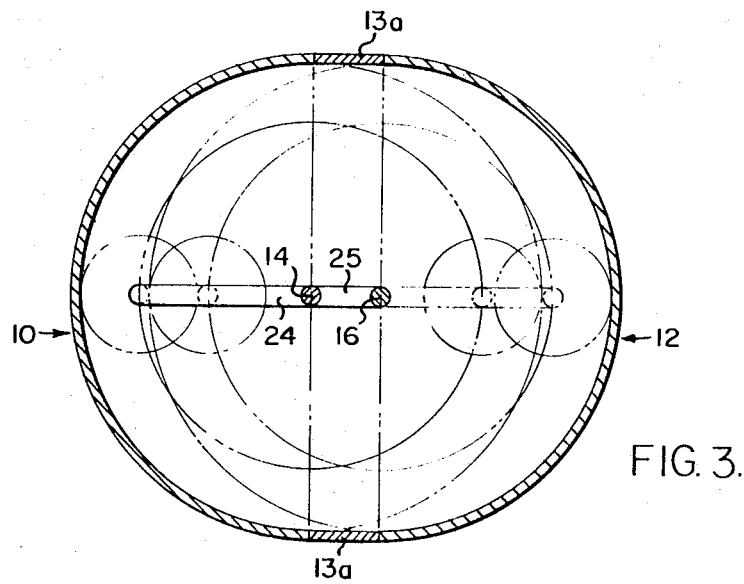
FIG. 3 is a top plan view taken on the line 3—3 of FIG. 1, the view illustrating the intermeshing screws in diagrammatic lines in the position according to FIG. 2.
Figure 4:
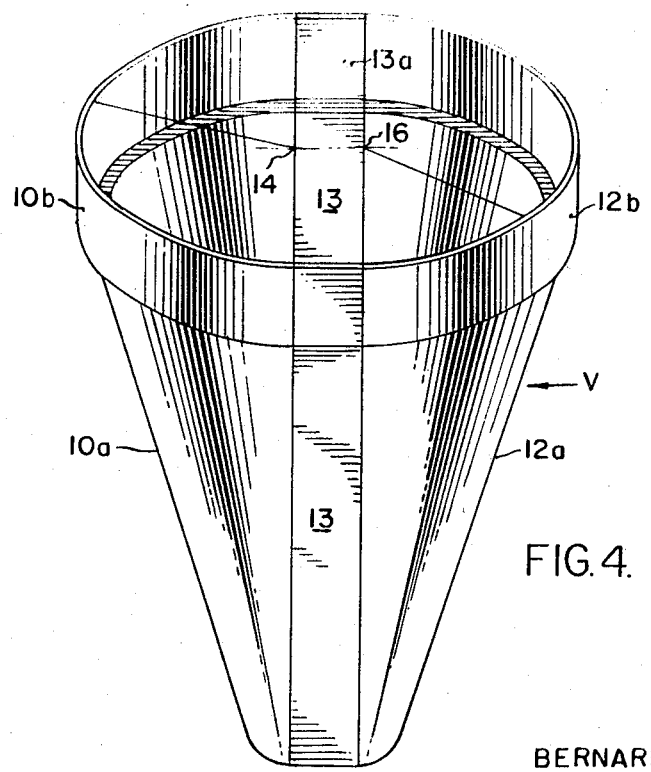
FIG. 4 is a perspective view of the container in which the screws are mounted.

Apparatus constructed in accordance with the invention comprises a mixing vessel or housing, generally designated V, and including two curved half-portions 10 and 12, having a pair of flat side portions 13 (Fig. 4) therebetween. The two curved half-portions 10 and 12 are identical and include semifrustoconical sidewalls 10A and 12A, symmetrical with respect to vertically extending axes 14 and 16, respectively. The width of side portions 13 which in the sectional plan view FIG. 3 extend linearly to connect sidewalls 10a and 12a is equal to the distance between axes 13 and 16.

The mixing apparatus further includes a pair of interwiping screws, generally shown at 18 and 20. Screws 18 and 20 respectively include a longitudinally extending axle 18' and 20', the longitudinal axes of which are parallel. Both of the screws preferably have the same pitch throughout their length, are of the same hand, and rotate in the same direction. The distance $d$ between the flanks of of 18, is gauged to accommodate the axial thickness $e$ of the embraced land of screw 20 considering the extreme positions (FIGS. 1 and 2) and the same thing is true of screw 20 with respect to its accommodating the land of screw 18. As will be described more fully hereinafter, the upper and lower flanks 18b and 18a, respectively, of screw 18 will alternately be wiped by the lower and upper flanks 20a and 20b of screw 20.

The upper portion of vessel V terminates in vertically extending semicylindrical wall portions 10b and 12b connected by flat portions 13a of the portions 13 and having an upper opening that is sealed by means of a cover or top T which is preferably releasably secured in position. A pair of crank members 24 and 25 are rotatably mounted in conventional bearing blocks 19 and 21 which are mounted in cover T. A pair of stems 24a and 25a connect the upper portion of crank members 24 and 25 with a suitable source of power, such as the gear reduction unit G which is connected with motor M through clutch mechanism C. Stem 24a is directly coupled to gear reduction unit G and power is also transmitted to stem 25a by a drivebelt 17 trained around a pair of pulleys 17a mounted on each of the stems 24a and 25a. The stems 24a and 25a extend along the vertically extending axes 14 and 16, respectively. The downwardly and outwardly inclined parallel lower portions of the cranks 24 and 25 are rotatably connected with the tops of individual screws 18 and 20 by a pair of bearings 26 and 27 surrounding axles 18' and 20', respectively. These bearings are such as to permit the screws 18 and 20 to rotate about their axes relative to ball joint bearing members 26 and 27 which may conveniently comprise a spherical collar 26a connected with each of the axles and located in a spherical rebate 26b connected with the lower portion of cranks 24 and 25.

Figure 1:
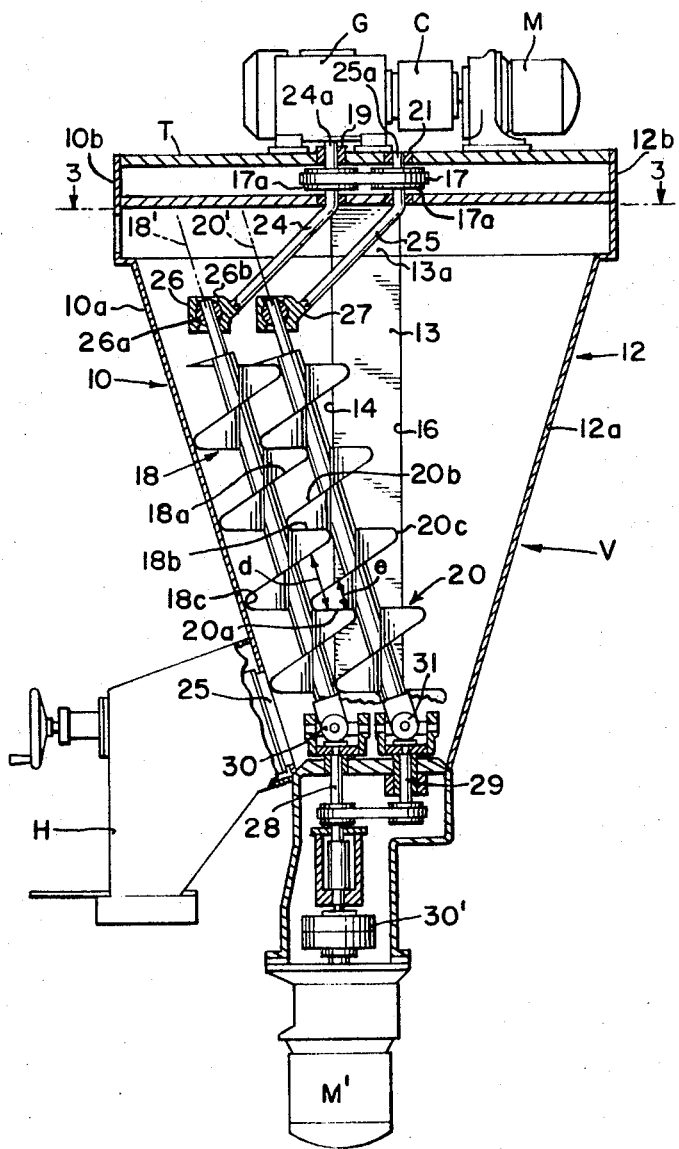
FIG. 1 is a cross-sectional view of the apparatus illustrating the intermeshing screws in one position.
Figure 2:
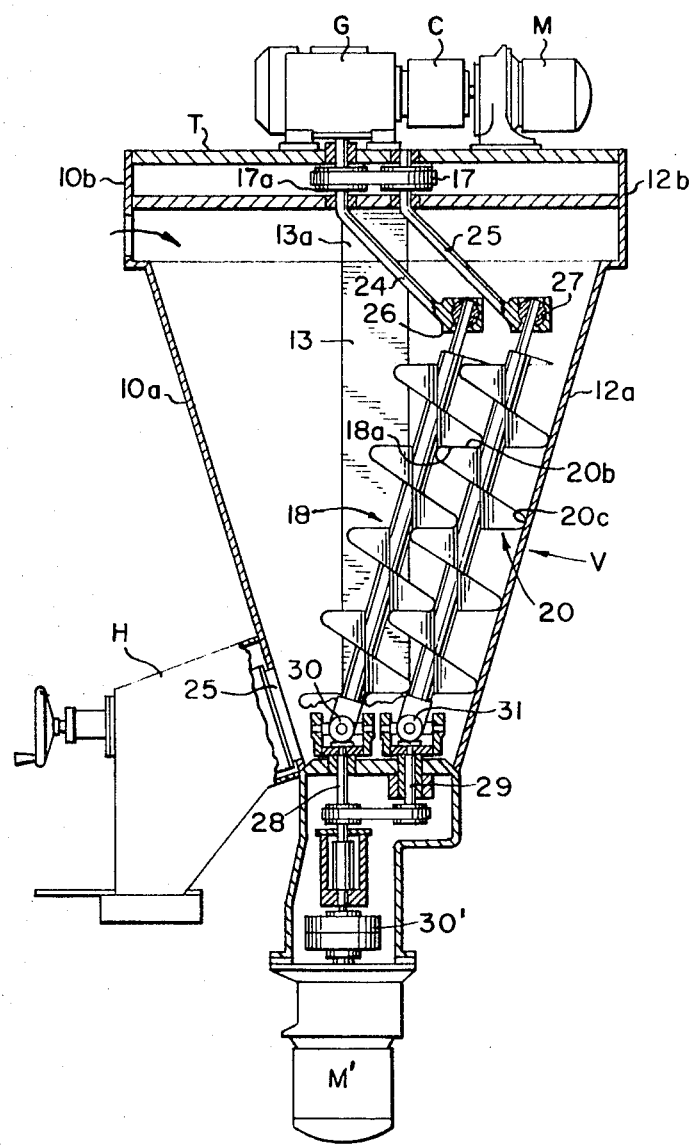
FIG. 2 is a cross-sectional view similar to FIG. 1 illustrating the same parts in a diametrically opposed position.

The lower ends of screws 18 and 20 are connected with a pair of input shafts 28 and 29 by means of universal joints 30 and 31, respectively. Shafts 28 and 29 are connected to a suitable source of power such as an electric motor M' through coupling 30'. The lower ends of screws 18 and 20 and universal joints 30 and 31 are also located on the vertically extending and spaced-apart axes 14 and 16. The power supplied through shafts 28 and 29 is effective to rotate screws 18 and 20 about their respective longitudinal axes. As shown in FIGS. 1 and 2, the radially outermost portions 18c and 20c of the lands of screws 18 and 20 are slidingly or wipingly engaged with conically shaped surfaces 10a and 12a, whereby any material adhering to these surfaces will be scraped therefrom. As shown in FIGS. 1 and 2, the longitudinally extending axes of the pair of screws 18 and 20 are parallel to each other and extend parallel to the generatrices of the sidewalls 10a and 12a. The crank members 24 and 25 are effective to orbit or rotate screws 18 and 20 relative to the vertically extending axes 14 and 16.

The pair of screws 18 and 20 are always maintained in intermeshing relation, with portions of each of the screws in scraping or wiping engagement, so that any material on the flanks of one screw is removed by the scraping action of the adjacent screw. When the screws are in the position shown in FIG. 1, the radially outermost portion 18c of screw 18 will slidably engage wall surface 10A and scrape or remove material adhering thereto, and when the screws are orbited to the opposite position, as shown in FIG. 2, the radially outermost portion 20c of screw 20 will engage conically shaped wall 12a and remove the material adhering thereto.

When the screws are in the positions shown in FIG. 1, the lower flank 20a of screw 20 is wiped by the upper flank 18b of screw 18. When the screw is in the diametrically opposed position as shown in FIG. 2, the lower flank 18a of screw 18 is wiped by the upper flank 20b of screw 20. An outlet hopper H including a door 25 may be provided adjacent the bottom of the vessel V to receive the mixed material.

In operation, material to be mixed is placed in the vessel and screws 18 and 20 are caused to rotate about their own axes by power supplied through shafts 28 and 29. In the position shown in FIG. 1, screw 18 wipes the interior surface of wall 10a while screw 20 wipes the upper flanks 18b of screw 18. Simultaneously, power is applied through stems 24a and 25a to orbit the screws 18 and 20 within the mixing container V to the position illustrated in FIG. 2, which in the process causes the lower flank portion 20a to be removed from upper flank portion 18b and causes the lower flank portion 18a to engage the upper flank portion 20b. At this time, as shown in FIG. 2, the interior surface of wall 12a will be wiped clean by the portion 20c of screw 20.

Thus, it can be seen that an apparatus is provided which not only cleans the inside walls of the container V, but also keeps the "grooves" of both screws clear of sticky material which would degrade and contaminate the remainder of the mixture. The twin screw arrangement also provides the desirable ancillary effect of reducing the mixing time which would be required if only one screw were utilized.

It should, of course, be realized that the screws could be of opposite hand and counterrotating. It is further to be understood that the invention is defined by the claims and the foregoing material is to be considered as illustrative only.

What I claim is:

1. Mixing apparatus comprising:
 a container having semiconically shaped sidewall surfaces and adapted to receive material to be mixed or treated;
 first and second rotatable longitudinally extending screws mounted for orbital movement about first and second upwardly extending and spaced-apart axes, respectively, within said container;
 said first and second rotatable screws each being mounted for rotation about its own longitudinal axis for mixing material within the container, the longitudinal axes of said first and second screws being upwardly extending and parallel;
 said screws including intermeshing lands with portions of the lands always being in wiping engagement to effect a mutual cleaning action therebetween, said lands each including upper and lower flanks; and
 means for orbiting said first and second screws about said first and second upwardly extending axes, respectively, in a manner to cause the upper and lower flanks of one screw to alternately engage and wipe the lower and upper flanks of the other screw.

2. The mixing apparatus of claim 1 wherein said longitudinal axes are parallel to at least a portion of said sidewall surfaces at any one time during said orbital movement.

3. The mixing apparatus of claim 1 wherein said first and second screws are orbited in a path to wipingly engage different portions of the said sidewall surfaces to remove material attached thereto; said longitudinal axes of said first and second screws being parallel with the generatrices of the sidewall surfaces which said first and second screws respectively engage during said orbital movement.

4. Mixing apparatus as set forth in claim 1 wherein said first and second screws cyclically slidingly engage portions of said sidewall surfaces to remove matter secured thereto.

5. Mixing apparatus as set forth in claim 1 wherein said means for orbiting said first and second screws includes a pair of downwardly, outwardly, and parallelly extending portions pivotally connected at their lower ends with the upper ends of said first and second screws.

6. Mixing apparatus as set forth in claim 5 including drive means for rotating said screws about their respective longitudinal axes; said upper ends of said pair of parallelly extending portions being rotatably mounted along first and second parallel, vertically extending, spaced-apart axes; and the lower ends of said first and second screws being connected with said drive means along said first and second axes respectively.

7. Mixing apparatus comprising:
 a single container adapted to receive material to be mixed or treated and including first and second symmetric sidewall surfaces which are generated about first and second spaced-apart axes respectively;
 first and second rotatable screws mounted for orbital movement about said first and second spaced-apart axes, respectively, within said container;
 said first and second screws each being mounted for rotation about its own longitudinal axis, the longitudinal axes of said first and second screws being parallel and said first and second screws being in intermeshing relation, with portions of each of said screws always being in wiping engagement to effect a mutual cleaning;
 means for rotating each of said first and second screws about its own axis to mix material within the container; and
 means for orbiting each of said first and second screws within said container, about said first and second axes respectively, to wipingly engage alternate ones of said pair of said sidewall surfaces with alternate ones of said screws to remove material attached thereto.

8. Material mixing apparatus comprising:
 a single container adapted to receive material to be mixed or treated and including a pair of opposed symmetric sidewall surfaces generated about first and second spaced-apart axes;
 first and second screws each mounted for rotation in said container about its own longitudinal axis, the longitudinal axes of said first and second screws being parallel, said first and second screws being in intermeshing relation with portions of each of said screws being in wiping engagement to effect a mutual cleaning;
 means for rotating each of said screws about its own axis;
 means mounting said first and second screws for movement in orbital paths about said first and second axes respectively to alternately wipingly engage alternate ones of said sidewall surfaces with alternate ones of said screws to remove material attached thereto, said orbital mounting means including first and second drive members connected with said first and second screws and movable in paths of travel so as to alternately overlie each other as said screw members alternately engage said opposite sidewall surfaces.

9. The apparatus of claim 8 wherein said drive members comprise first and second radially outwardly and parallelly extending portions pivotally connected to said first and second screws.

10. The apparatus set forth in claim 8 wherein said pair of opposed symmetric sidewall surfaces comprise semiconically shaped portions connected by generally straight sidewall portions having a length equal to the distance between said first and second axes.